Patented Oct. 24, 1950

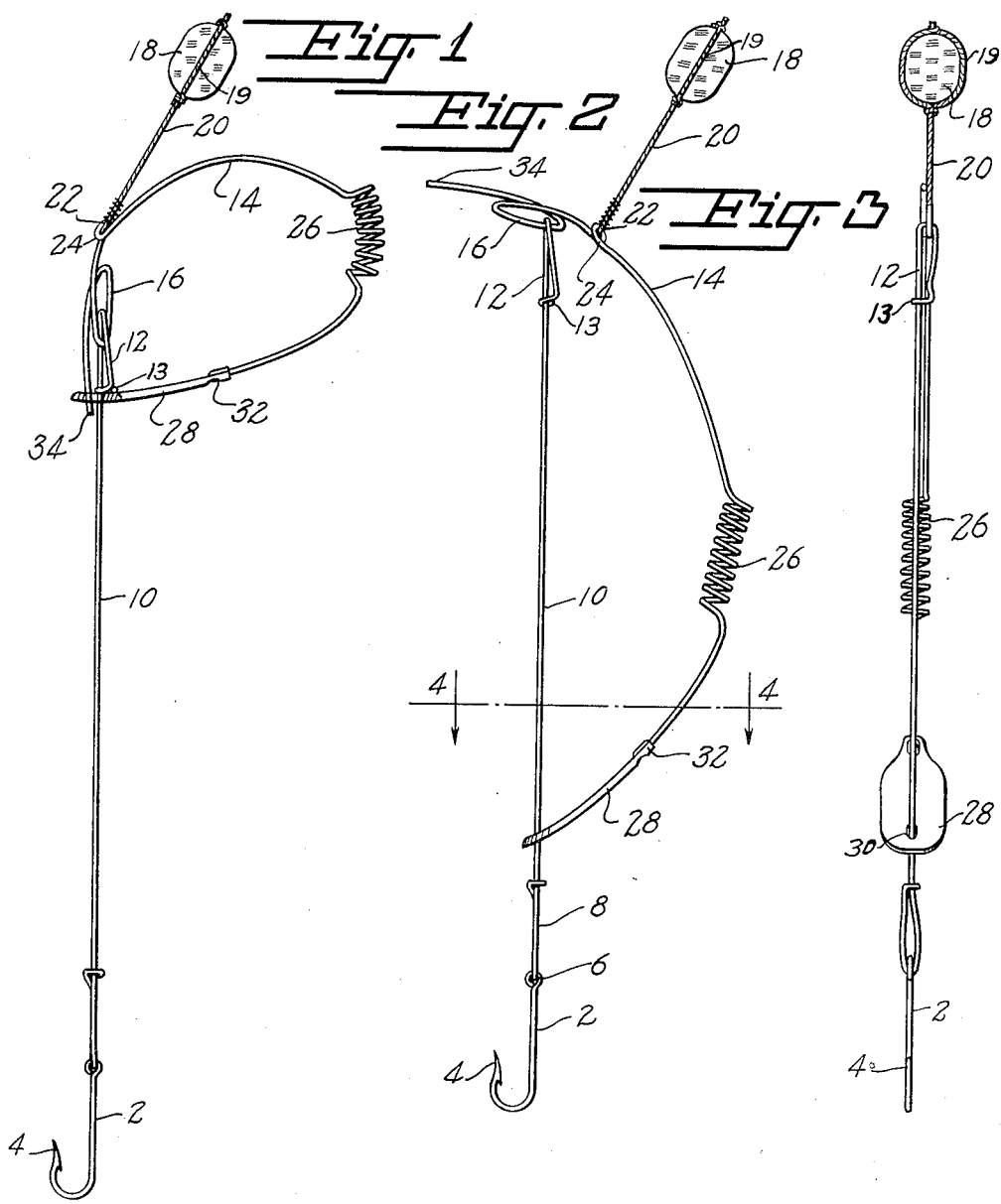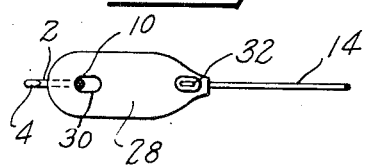

2,526,980

UNITED STATES PATENT OFFICE 2,526,980

HOOK SETTER FOR FISHING TACKLE

John Turchan, Akron, Ohio

Application October 19, 1948, Serial No. 55,347

2 Claims. (Cl. 43—15)

My present invention relates to an improved hook setter for fishing tackle and especially to a spring device applicable to conventional hook links so that when the attracted fish touches the bait and/or hook the device will jerk the hook thus setting the hook firmly in the mouth of the fish.

According to my invention I employ a spring bow one end of which is slidable on the link and including a plate which is sprung downwardly against the water to snap the hook up.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the device of my invention partly in section to more clearly show the device cocked and ready to snap.

Fig. 2 is a similar view of the device uncocked.

Fig. 3 is an edge view.

Fig. 4 is a sectional view at line 4—4 of Fig. 2.

Referring now to the drawings wherein I have illustrated the present preferred embodiment of my invention I employ a conventional hook 2 barbed at 4 and having an eye 6 secured to the loop 8 of link 10. The link 10 is of straight wire of considerable relative length and has a similar attaching loop 12 at the top thereof.

The setting device comprises a wire length 14 having an elongated slip loop 16 secured in loop 12 and a bobber 18 is attached by means of a loop 19 to a wire or cord fishing line 20 having an eye 22 secured to loop 24.

Near the other end of the wire 14 a helical coil 26 is formed and at the end of the wire I employ a plate 28 rigid therewith and having an opening 30 through which the link 10 passes. Obviously the plate will permit the relative movement of the link.

To cock the device, the wire 14 is bowed sliding the plate up on the link and the end 34 of wire 14 is also inserted in the opening 30. The tension on the setter will delicately retain the plate up and the wire 14 bowed.

Should a fish touch the hook 2 or the bait thereon the link 10 will move downwardly through the opening 30 in the plate 28 and the attaching loop 12 will move downward in the slip loop 16 until the end 13 of the loop 12 about the link 10 engages and pushes downward on the plate 28 causing the end 34 of wire 14 to be dislodged from the opening 30. The spring tension of wire 14 and coil 26 is such as to tend to straighten out the bowed wire.

The plate however meeting the resistance of the water will react in reverse to jerk the link through the plate and the hook will be jerked upwardly thereby impaling the fish.

The device of my invention is easily set and delicately balanced so that the slightest touch of the fish will disengage the plate from the bow end and the natural resistance of water to the movement of the plate therethrough will cause a positive snap of the link and hook.

Having thus fully described my invention what I claim as new and desire to secure by Letters Patent is:

1. A fish hook setter for use with a fishing line comprising a straight link having a hook on the lower end thereof, said link having an upper loop, a wire bow, a slip loop on one end of the bow slidably engaging the link loop, a plate on the opposite end of the bow and having an opening receiving the link, and the other end of the bow at the slip loop being insertable in the opening when the bow is cocked whereby a slight pull on the fish hook will cause the upper loop to strike the plate and disengage the plate from the bow end at the slip loop and resistance of water to plate movement will snap the link and hook upwardly.

2. A fish hook setter as in claim 1 wherein said wire bow is provided with an eye for attaching a fishing line thereto and an intermediate coil to add tension thereto.

JOHN TURCHAN.

REFERENCES CITED

The following references are of record in the file of this patent:

UNITED STATES PATENTS

| Number | Name | Date |
|---|---|---|
| 677,655 | Gary | July 2, 1901 |
| 999,214 | Filipowski | Aug. 1, 1911 |

FOREIGN PATENTS

| Number | Country | Date |
|---|---|---|
| 86,160 | Austria | of 1921 |